G. E. McKENNEY.
COFFEE URN.
APPLICATION FILED AUG. 8, 1919.

1,317,717.

Patented Oct. 7, 1919.

Witness:
John Enders

Inventor:
Gervis E. McKenney,
by Robert Burns
Atty.

UNITED STATES PATENT OFFICE.

GERVIS E. McKENNEY, OF CHICAGO, ILLINOIS.

COFFEE-URN.

1,317,717.  Specification of Letters Patent.  Patented Oct. 7, 1919.

Application filed August 8, 1919. Serial No. 316,031.

*To all whom it may concern:*

Be it known that I, GERVIS E. McKENNEY, a citizen of the United States of America, and a resident of Chicago, in the county of Cook, State of Illinois, have invented certain new and useful Improvements in Coffee-Urns, of which the following is a specification.

This invention relates to that class of coffee urns generally employed in eating houses and the like, and has for its object:

To provide a simple and efficient structural formation and association of parts in a coffee extracting urn adapted to effect a rapid and thorough extraction of the active or desirable portions of the ground coffee with the consequent production of a greater quantity of coffee beverage of the required grade, than has heretofore been obtained from the ordinary urns using a containing bag suspended within the urn chamber, and with an avoidance of the labor and trouble of keeping such bags in proper sanitary and usable condition, all as will hereinafter more fully appear.

In the accompanying drawing:

Fig. 1.

Like reference numerals indicate like parts in both views.

Figure 1:
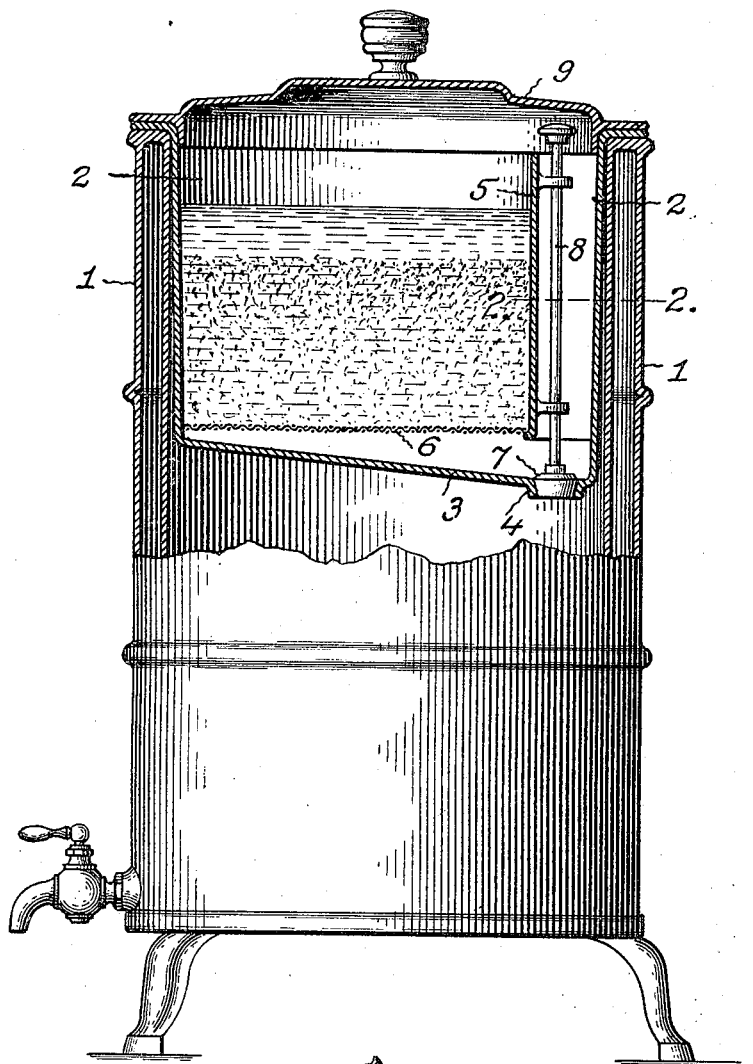
Figure 1, is a central vertical sectional elevation of a coffee urn embodying the preferred form of the present invention.
Figure 2:
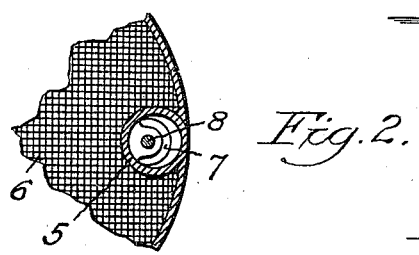
Fig. 2, is a detail horizontal section on line 2.—2.

Referring to the drawing, 1 designates the casing of the main portion or body of a coffee urn of the usual water jacketed construction, with its lower portion forming a receiving compartment for the made coffee while its upper end is open and receives the container now to be described of the present improvement.

2 designates a container or shell adapted to fit inside the upper portion of the main casing 1, and supported at its upper end therein in a readily removable manner. In the present improvement the container 2 is open at top and is provided with a closed inclined bottom 3 adapted for draining to one side of the container, and at such side is formed with an outlet neck or passage 4 communicating with the lower receiving compartment of the urn 1 aforesaid. In line with the outlet neck 4, the vertical wall of the container or shell 2 is formed with a vertical inset partition 5 forming a passageway or chamber for the operating stem of the movable valve member hereinafter described, and by which the aforesaid outlet neck or passage 4 is closed.

6 designates a perforated partition of any usual material and formation, attached within the container or shell 2 a short distance above the inclined bottom 3 aforesaid, and extending the full horizontal area of said container or shell 2 in order to afford a rapid drainage operation when the made coffee is ready to descend into the aforesaid lower receiving compartment of coffee urn 1 and on the opening of the outlet passage 4 aforesaid. In the present construction the perforated partition 6, ends at one side in the aforesaid chamber forming partition 5, so that the vertical passageway formed by such partition is left unobstructed for the movement of the controlling valve and its operating stem now to be described.

7 designates an upwardly opening valve head associated with the outlet neck or passage 4 aforesaid, and having an operating stem 8 extending upwardly to the top of the container or shell 2 for convenient operation by the attendant.

9 designates a cover adapted to fit and close the upper end of the container 2, and preferably adapted to effect a like closure of the upper open end of the main portion 1 of the coffee urn, when said container 2 is removed for cleaning, replenishment, etc.

The operation of the present apparatus is as follows:—

The proper quantity of ground coffee is placed in the container 2 and the proper amount of hot water poured thereon, and left to steep for the proper length of time with the cover 9 in place, and with the valve head 7 in its closure position. During one or more intervals in the period of steeping aforesaid, the cover 9 is removed and the contents of the container stirred by the attendant with a spoon or like stirrer. With the expiration of the proper period of time above mentioned, the valve head 7 is pulled away from the outlet neck or passage 3, to permit the liquid contents of the container to flow down into the lower compartment of the main urn 1, and such flow has been found to be quite rapid owing to the extensive area of the perforated partition 6, and that such rapid flow is effected without any of the finer particles of the ground coffee passing through with the liquid contents of the container.

Having thus fully described my said invention what I claim as new and desire to secure by Letters Patent, is:—

1. In a coffee urn, the combination of an open top urn body, a container or shell fitting the upper end of said urn body, the container being open at top and provided with a closed bottom, with an outlet passage at one side of said bottom and with an inset partition in line with said outlet passage, a perforated partition arranged in said container at a point above its bottom and having an area approximating the horizontal area of the container, and a valve head closing the aforesaid outlet passage and having a vertical stem arranged in the passageway formed by the inset partition aforesaid, subtantially as set forth.

2. In a coffee urn, the combination of an open top urn body, a container or shell fitting the upper end of said urn body, the container being open at top and provided with a closed bottom inclined to one side of container, with an outlet passage at one side of said bottom and with an inset partition in line with said outlet passage, a perforated partition arranged in said container at a point above its bottom and having an area approximating the horizontal area of the container, and a valve head closing the aforesaid outlet passage and having a vertical stem arranged in the passageway formed by the inset partition aforesaid, substantially as set forth.

Signed at Chicago, Illinois, this 31st day of July, 1919.

GERVIS E. McKENNEY.

Copies of this patent may be obtained for five cents each, by addressing the "Commissioner of Patents, Washington, D. C."